(12) United States Patent
Pellicori

(10) Patent No.: US 6,191,891 B1
(45) Date of Patent: Feb. 20, 2001

(54) SYSTEM FOR PRODUCING UNIFORM ILLUMINATION FOR TESTING TWO DIMENSIONAL DETECTOR ARRAYS AND OPTICAL SYSTEMS

(75) Inventor: Samuel F. Pellicori, Santa Barbara, CA (US)

(73) Assignee: Sylvia Y. Kan, Torrance, CA (US)

( * ) Notice: Under 35 U.S.C. 154(b), the term of this patent shall be extended for 0 days.

(21) Appl. No.: 09/167,043

(22) Filed: Oct. 5, 1998

(51) Int. Cl.⁷ .............................. G02B 5/02; G02B 21/00; F21V 29/00; F21V 7/00
(52) U.S. Cl. ..................... 359/599; 359/364; 362/268; 362/301; 356/371
(58) Field of Search .................................. 362/268, 293, 362/282, 284, 322, 323, 324, 301; 359/599, 503, 364; 356/371

(56) References Cited

U.S. PATENT DOCUMENTS

| | | | |
|---|---|---|---|
| 5,497,234 | * 3/1996 | Haga | 356/371 |
| 5,612,797 | * 3/1997 | Clarke | 349/5 |
| 5,956,106 | * 9/1999 | Peterson et al. | 349/64 |

* cited by examiner

Primary Examiner—Cassandra Spyrou
Assistant Examiner—Leo Boutsikaris
(74) Attorney, Agent, or Firm—Curtis L Harrington

(57) ABSTRACT

A compact, efficient illumination system has many advantages over conventional illuminators based upon integrating spheres. An elliptical light source/concentrator, preferably controlled by a light stabilization system using optical feedback to control the light intensity, provides high spatial uniformity of high irradiance values can be produced over sizeable areas for testing large area detector arrays. The illuminator is simpler and more economical than traditional systems and provides extended wavelength coverage potential. The illumination system is easy to maintain.

15 Claims, 2 Drawing Sheets

SYSTEM FOR PRODUCING UNIFORM ILLUMINATION FOR TESTING TWO DIMENSIONAL DETECTOR ARRAYS AND OPTICAL SYSTEMS

FIELD OF THE INVENTION

This application relates to the field of self contained, portable machines and test equipment for optical detectors, such as CCD and CMOS imaging devices, and more particularly to a compact, efficient illumination system which produces light having high spatial uniformity, high irradiance, and large area coverage for testing large area detector arrays.

BACKGROUND OF THE INVENTION

One of the fastest growing segments of the electro-optic art involves the use of photo electric detector arrays used in cameras and detectors for consumers, machine imaging and inspection imaging. The advancement is this area has been so extensive and so rapid at the technically advanced side of the market that the technology has enabled individually owned electronic cameras to begin to supplant cameras which use film and chemical development. The more technical side of the electronic imaging industry continues to advance and demands ever increasing sensitivity to produce a product of ever increasing quality. Increased affordability is had through mass production and the lowering of production costs while keeping the product quality high.

To consider a simple electronic camera as an example, the main component is a two dimensional electronic array, typically a silicon-based device having thousands of pixels of a size less than 20 micrometers each. The remaining parts of the camera are far less critical and include a lens, a focusing system for physically moving the lens, and computer memory storage. The quality and suitability of the two dimensional detector array will determine whether the camera will function properly. As it is the most expensive and critical component in the camera, if it is defective, the camera as a whole is virtually worthless.

The critical need is therefore to properly test two dimensional arrays with as much speed and accuracy as possible to eliminate the defective components very early in the manufacturing process, at each stage before additional value can be added. Quality control is of paramount importance in the products which use two dimensional detector arrays, but the even the tightest production and quality testing program cannot achieve its goals without the very most efficient test equipment. This problem is significant for low end products like ordinary digital cameras, but it is acute for high end and specialty two dimensional array products. Commercially available test illuminators do not provide uniform coverage over areas larger than about 24 square millimeters. There are not self-contained instruments for testing CCD arrays; such test instruments are generally assembled from separate components onto an optical bench, they are not suitable for the production environment, but rather for laboratory checks. As will be shown, currently available illumination test equipment fails to give the greatest efficiency both because of failure in spatial illumination and uniformity and because of losses in illumination intensity resulting in inefficiency. In addition, the structure gives greater ease of use.

Proper evaluation of the functional performance of large two dimensional detector arrays for camera vision requires spatially uniform levels of illumination. Commercially available test illuminators are low in efficiency, large, and bulky. Existing illuminators have achieved spatial uniformity approaching a one percent variance taken over a rather small its illuminating area. This value is unacceptable where high quality and very tight production control is essential. Existing illuminators are based upon the use of a spherical integrator to attempt to statistically randomize the distribution of illumination. A spherical integrator relies upon a relatively large sphere having an internal surface for re-radiating light directed toward the internal surface back onto an illumination test area. The idea behind the spherical illuminator is that even if the light source produces a partial shadow or a partial bright area as light emanates from the source, that using the spherical section to homogenize the light energy will "smooth out" the light or dark portion. This is based upon view factor, which uses the fact that each point in the illuminated field receives a fairly even summing contribution of the light from each portion of the spherical reflector. Where the target two dimensional array is placed so that it is surrounded by the hemispherical reflector, the maximum area (for illumination of one side of the two dimensional array) is available for each micro portion of the array to receive an even, summed average of the contribution from each re-radiating segment of the hemispherical array. Light from the lamp is spatially randomized by not only direct reflection from the lamp and the wall of the spherical section surface, but also by multiple internal sphere wall reflections which provide smoothing of severe light and dark spots. Usually, the internal spherical section is either made of a material having a very high, diffuse reflectance, and which can maintain the high, diffuse reflectance over a wide spectrum of light frequencies, or it has a surface coating of white paint possessing these similar light diffusing and handling properties.

Conventional reflecting spheres attempt to provide a uniform nearly ideal distribution of light, known as Lambertian distribution, where the reflected intensity is substantially independent of the angle of incidence. However, commercially available test illuminators are low in efficiency, large and bulky and do not provide uniform illumination coverage over the minimum required coverage area of about 24 millimeters unless they are very large. The output or reflective efficiency is a function of the overall area occupied by the radiating lamp, its base and other support structure, which may be referred to as a lamp port, the exit port of the sphere, and the whole wall area. The presence of ports is deleterious because it interferes with the homogenization process. The radiant output of an integrating sphere may be calculated from the following equation:

$$L_{out} = R\phi_1/\pi A[1-R(1-Ap/A)]$$

where R is the wall reflectance, $\phi_1$ is the input flux, A is the sphere section wall area, and Ap is 2.0, the area of the ports.

As an example of the strong dependence on wall reflection, if the wall reflectance changes from about 0.98 to about 0.97, the value of $L_{out}$ changes to 86% of its former value. Thus the output is very critically sensitive to changes in reflectance. Wall reflectance must be precisely maintained over time since even the smallest change in the reflectance has a disproportionately large impact on efficiency.

The throughput efficiency is calculated for a sphere capable of illuminating a circle having four inch diameter. A reasonably sized sphere must be twelve inches in diameter; the input (lamp) port is about one inch in diameter. The energy throughput is calculated fro the following equation:

$$T + (R\ Ae/A)/(1-R[1-(Ae+Ai)/A]$$

Where Ae and Ai are the areas of the exit and entrance ports (which equal about 20.6 inches$^2$ and where wall reflectance is about 0.98. This gives a throughput of about 42% of the available input energy.

The output distribution of an integrating sphere is uniform into about 2 π steradians. The irradiance received at a detector to be tested is ΩN, where Ω is the solid angle subtended by the detector, and N is the radiance of the port. A detector to be tested and having an area of 1 centimeter by 1 centimeter square and located four inches from a seventy five millimeter diameter exit port will receive approximately 28% of the output of the sphere because it captures only 0.28 steradaiance. Multiplying the physical inefficiency of 0.28 times the transmission inefficiency of 0.42 gives an overall composite efficiency of about 0.12 or about 12%. In other words, and from a purely physical explanation, the amount of useable energy output from the sphere is only about 12% of the total available lamp power. Conversely, 88% of the energy is wasted.

Given this low level of efficiency, attempted compensation requires the use of a very high wattage lamp to power the illumination test system. A heating problem is thus created since about 80% of the energy going into the bulb is given off as waste heat which needs to be dissipated. Heat dissipation by providing openings in the sphere decrease would decrease its efficiency even further. A pure air ventilation system to compensate for the heat load would probably require refrigeration in order to work optimally. Resulting temperature changes from heating will introduce error into the two dimensional array measurement.

Further, the material from which the spherical wall is made is very expensive, regardless of whether it is machined from a solid or applied as a paint. The disadvantages are cost, large size and bulk and especially the waste heat energy which is not only a problem in itself, but as a source of error as stray light which unwantedly can heat the two dimensional array.

It is desirable to provide a relatively smaller beam cross section so that the homogeneity can be controlled. In the integrating sphere system it would be necessary to provide additional optics to reduce the beam diameter to a reasonable size to accommodate economical filter sizes, such as on the order of twenty five millimeters in diameter. The use of additional optics would further the already high losses of the integrating sphere and modify the solid angle factors of the optical system, thus reducing deliverable efficiency. The desirable small beam diameter is simply not practical with the integrating sphere. A structure is needed which is portable, efficient, stable compact and which facilitates field testing of imaging detector arrays and systems.

SUMMARY OF THE INVENTION

A structure and system is provided for both avoiding the limitations on the currently available test devices and providing a source of uniform illumination that is compact, efficient and portable. An elliptical light source/concentrator is preferably controlled by a light stabilization system using optical feedback to control the light intensity. Light from the elliptical light source/concentrator is directed through a field homogenizer & shutter, and then through spectral filter and attenuation wheels, all of which individual components are commonly commercially available. The spectral filter & attenuation wheels are driven by a filter wheel/shutter drive controller. Light directed through the field homogenizer & shutter, and spectral filter and attenuation wheel is thus further smoothed of its spatial unevenness, before being directed through an achromatic collimating lens to then produce uniform pupil irradiance. It is preferred for the target uniform pupil irradiance to be a circle of about two inches in diameter to provide a convenient sized illumination area for testing.

The light source is preferably a high temperature quartz halogen lamp which produces an output spectrum corresponding to a 3200 degree Kelvin black body radiator, or 3200° K source. The lamp's filament should be selected to occupy as small of an area as is possible, and preferably near a one millimeter by about two millimeter size. The lamp can be chosen from commercially available lamps and is preferably positioned at one focus of a reflective ellipsoid. The lamp envelope is preferably sand blasted with a fine grit to smooth out the features of the lamp envelope which would otherwise contribute to hot and cold spots in intensity distribution.

A second focus of the ellipsoid is gained by cutting away approximately one half of the ellipsoid body. The ellipsoid has been found to operate well at f/0.8 and collects energy from the filament within a solid angle which exceeds 1.25 π stearadians. Light energy from behind the filament is also collected and radiated forward by the ellipse, which nearly doubles the collection of emitted energy. All of the light energy is imaged to a small area at the second focus where the light energy concentration density is doubly high. By comparison, a typical concave spherical mirror or convex lens concentrator operating at f/1.0 collects π steradians, and only forward going energy is imaged since the filament is in the way of reflected backward going energy. Thus, an ellipsoid collector makes more efficient use of lamp output power. The concentrated spot is an enlarged image of the lamp.

Spaced a specific distance from the concentrated image is a short focal length aspheric lens which collects image energy within a large solid angle. A focal length of about fifteen to twenty millimeters for the aspheric lens works well to collect image energy within a large solid angle corresponding to f/0.8.

The presence of a diffusing element of controlled scatter distribution near the field lens can further smooth out the residual spatial variations by integrating over a larger solid angle in the image and result in a uniformity having variations less than one percent and will be described more fully below.

The utilizable energy from the lamp concentrated by the ellipsoidal mirror is at least three times greater than the utilizable energy from an integrating sphere. The losses due to imperfect reflection and lens transmission give a throughput of about 75% compared to 12% for the integrating sphere. This results in a light efficiency of at least 15 times greater with illuminator of the invention, and therefore does not require high wattage lamp to create an initially high illuminance level, which would also create undue amounts of heat and which would otherwise require additional heat rejection structures. The illuminator of the present invention has a significantly higher energy density at the pupil or output plane than is achievable with an integrating sphere.

The illuminator of the invention is also more compact and portable because the excessively large and inefficient volume of the sphere is eliminated. In accord with a preferred embodiment, the volume of the illuminator of the invention is contained within a 17.3 inch (44 centimeters)×10.5 inch (26.7 centimeters)×7.5 inch (19 centimeter) space, and the weight, excluding power supply is about 20 pounds (9.0 killograms). An integrating sphere capable of delivering the same target illumination would weight at least twice the weight of the illuminator and require four times the volume.

Contamination of the surfaces of an integrating sphere diffuser translates to more than a proportionate light loss.

Degradation of the surface of the integrating sphere is not easily repairable and typically requires an expensive re-coating process. The illuminator of the present invention has optical surfaces which are polished, rather than diffused, and are readily cleanable by technicians if any surface becomes dirty. Cleaning the surfaces will restore the high efficiency designed into the illuminator.

The illuminator output stearadiance is controlled to within a specific solid angle to eliminate stray ray contributions which would otherwise contribute to non uniformity in illumination.

The illuminator of the invention is not limited by the properties of available white surface material. The illuminator can operate with light wavelengths from the ultraviolet range to the infrared regions simply by insuring that the appropriate lens materials are chosen and that the ellipsoid reflective coating matches the wavelength range used.

The removal of unwanted heat energy from a light beam is facilitated by the use of a dichroic coating on the internal reflective surface of the ellipsoid. A dichroic coating reflects wavelengths from about 400 nanometers to about 750 nanometers efficiently while accepting and absorbing longer wavelengths which are useless heat. This dichroic coating is also generally known as a "cold mirror" because it reflects the desired visible wavelengths and eliminates the non-useful infrared energy. Cold mirrors are vacuum deposited coatings designed to facilitate heat removal.

In addition, concentration of the light beam to a small area permits the insertion of filters of a reasonable size to accommodate economical filter sizes, for spectral bandpass isolation and attenuation. The desirable small beam diameter occurs naturally with the illuminator of the invention.

BRIEF DESCRIPTION OF THE DRAWINGS

The invention, its configuration, construction, and operation will be best further described in the following detailed description, taken in conjunction with the accompanying drawings in which.

DETAILED DESCRIPTION OF THE PREFERRED EMBODIMENT

Figure 1:
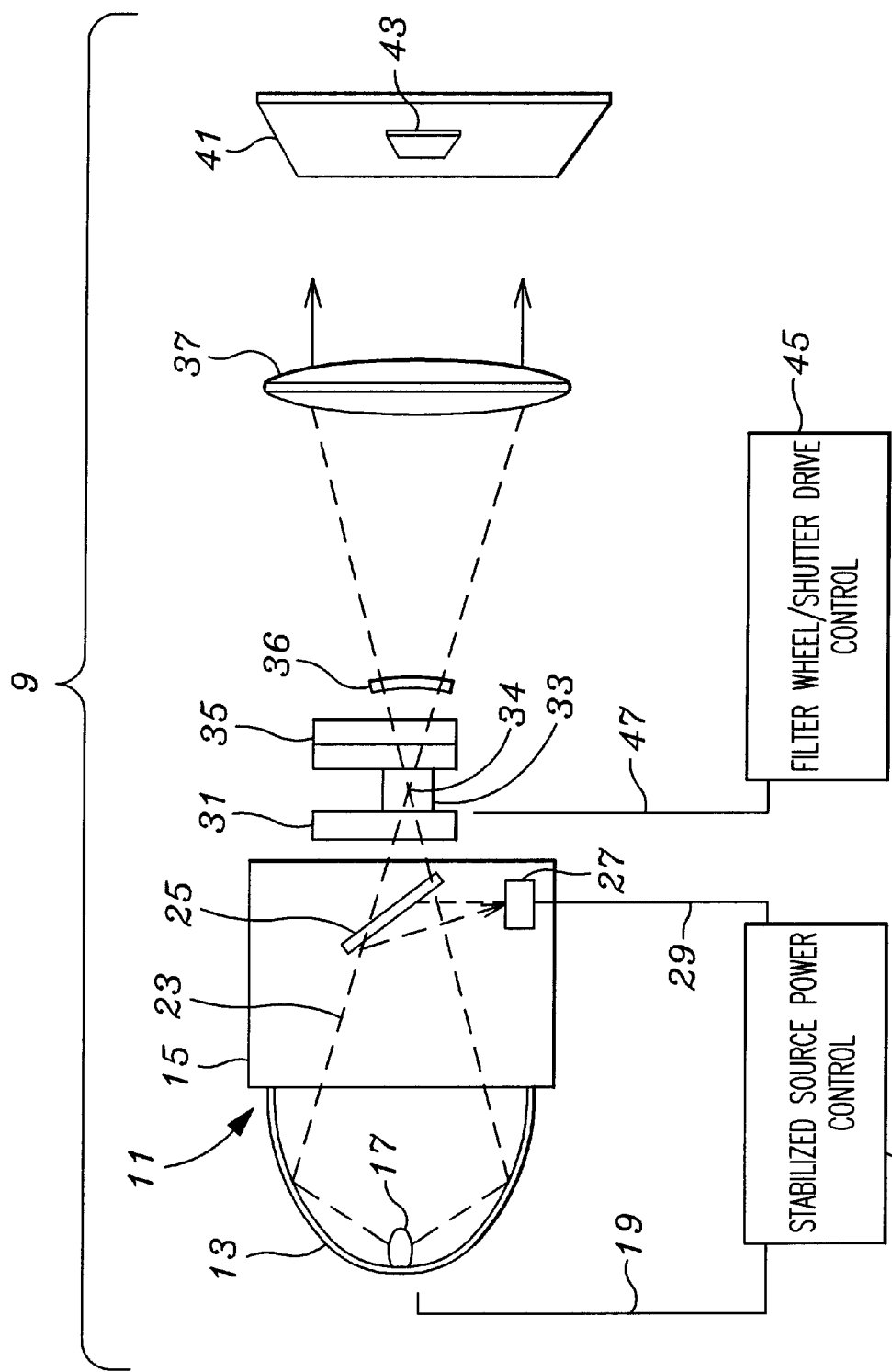
FIG. 1 is a schematic illustration, from a side view, of the illuminator of the invention and illustrating the preferred arrangement of the elements.

The description and operation of the invention will be best described with reference to FIG. 1 which illustrates an illuminator system 9. At the far left of the Figure the illuminator system 9 includes a source collector/concentrator 11, which includes an ellipsoidal mirror 13 and an extension housing 15. An ellipsoidal mirror is commercially available as an elliptical collector assembly with cold mirror coating designated E241-2 from Optiforms, Inc., Temecula Calif. The ellipsoidal mirror 13 supports a lamp 17, again preferably having an output corresponding to a 3200 K source. The lamp 17 is powered by an electrical power line 19 which extends from a STABILIZED SOURCE POWER CONTROL 21, commercially available as a photo feedback system from Oriel Corporation, Stamford Conn. Lamp 17 emits light in many directions, a single pair of paths shown by dashed lines 23, referred to as beam 23. Dashed lines of beam 23 generally represent the outer angular extent of the light beam.

Within the extension housing 15, a partially reflecting mirror 25 is coupled to divert energy of wavelengths longer that 750 nanometers of the beam 23 into a detector 27. The amount of energy diverted is not part of the test energy because it is of infrared wavelength. Partially reflecting mirror 25 is therefore also a heat rejecting filter which is commercially available as a heat reflecting, visible transmitting filter available from ZC&R, Los Angeles, Calif.

The detector 27 is also connected, through a, shielded lead 29, to the STABILIZED SOURCE POWER CONTROL 21. The control 21 stabilizes the light output of the lamp 17 to further stabilize the system 9, and to insure that the intensity output of the lamp 17 does not change intensity, or drift over time.

Light leaving the extension housing 15 is directed through field homogenizer and shutter 31 and 33. Field homogenizer and shutter 31 and 33 also contains a field lens and diffuser disks, and will be fore fully explained with respect to FIG. 2. Light leaving the field homogenizer and shutter 31 and 33 goes through a second focus 34 and then optionally to a spectral filter 35. Spectral filter 35 is shown as two layers and may be multiple layers, each layer perhaps representing a different type of filter. Spectral filter 35 may be a bandpass, band stop, low pass or high pass filter. The selection of the filter is based upon the light characteristics with respect to which the two dimensional array is to be tested. Further, the spectral filter 35 may be a neutral density filter which varies the level of output irradiance without affecting the spatial homogeneity of the light beam. The spectral filter 35 may also include heat rejection coatings to reduce heating of the filter 35. Beyond the spectral filter 35, light is made to pass through a meniscus lens 36. Meniscus lens 36 is preferably a lens having a forty millimeter focal length.

Beyond the meniscus lens 36, an achromatic collimating lens 37 is the last optical element before the light continues to a target area 41, which can be on any surface or test stand, where one or more two dimensional arrays 43 may be located.

Also seen in FIG. 1 is a FILTER WHEEL/SHUTTER DRIVE CONTROL 45 connected with an electrical lead to field homogenizer and shutter 31 and 33 and which operates and controls field homogenizer and shutter 31 and 33.

Figure 2:
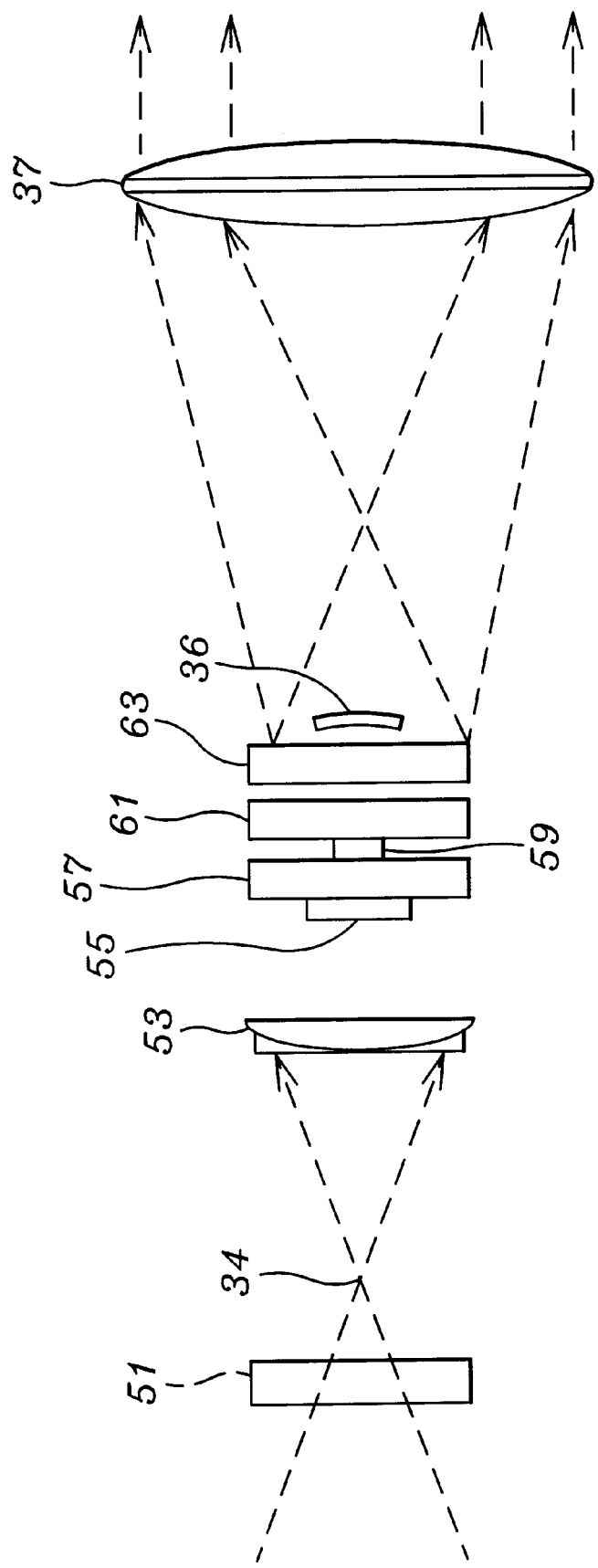
FIG. 2 is an expanded view of the optical arrangement seen in FIG. 1.

Referring to FIG. 2, further internal details of the field homogenizer and shutter 31 are seen. The system 9, as shown beginning at the left, includes a first diffuser disks 51. The diffuser disk 51 can be a holographic diffuser and is commercially available from Physical Optics Corp, Torrance, Calif. To the right of the diffuser disk 51 and further downstream of the path of light flow is an aspheric field lens 53 is seen spaced a specific distance from the second focus 33 of the ellipsoidal mirror 13. Aspheric field lens 53 is commercially available in a 20 millimeter focal length from Edmund Scientific, located in New Jersey.

A second holographic diffusers 55 of similar construction to the diffuser 51 is in the path of optical propagation. Next is a first neutral density filter wheel 57, shutter 59, and a band pass filter wheel 61 and a second neutral density filter wheel 63. Downstream of the second neutral density filter wheel 63 is the meniscus lens 36 and collimating lens 37 which were seen in FIG. 1 and reproduced for relative spatial reference.

While the present invention has been described in terms of a illuminator system for testing two dimensional arrays, one skilled in the art will realize that the structure and techniques of the present invention can be applied to many similar optical appliances. The present invention may be applied in any situation where light density is to be concentrated, diffused and then used to illuminate a target area.

In addition to the specific commercial availability of components listed, other filter wheels, computer drives, various bandpass filters, neutral density filters and other components are be commercially available from CVI Laser Corporation, Albuquerque, N. Mex.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. An illuminator system for producing light having high spatial uniformity comprising;
   an ellipsoidal reflector having a first focal point;
   a lamp located at said first focal point with respect to said ellipsoidal reflector, said ellipsoidal reflector and said lamp for producing light output in a first direction;
   an aspheric field lens in optical alignment with at least one of said ellipsoidal reflector and said lamp for receiving and transmitting light propagating in said first direction from said ellipsoidal reflector and said lamp;
   a diffuser in optical alignment with at least one of said ellipsoidal reflector and said lamp for receiving and transmitting light propagating in said first direction from said ellipsoidal reflector and said lamp;
   an achromatic lens in optical alignment with said at least one of said ellipsoidal reflector and said lamp for receiving light propagating in said first direction from said ellipsoidal reflector and said lamp, said transmitted light having high spatial uniformity; and
   a meniscus lens in optical alignment with one of said lamp and said ellipsoidal reflector.

2. The illuminator system as recited in claim 1 wherein said diffuser is a holographic diffuser.

3. The illuminator system as recited in claim 2 and further comprising a plurality of said holographic diffusers.

4. The illuminator system as recited in claim 1 and further comprising a heat rejecting filter interposed between said lamp and one of said aspheric field lens and said diffuser, said heat rejecting filter in optical alignment with both said lamp and said one of said aspheric field lens and said diffuser.

5. The illuminator system as recited in claim 1 and further comprising a spectral filter in optical alignment with one of said lamp and said ellipsoidal reflector.

6. The illuminator system as recited in claim 1 and wherein the spatial order of alignment is, after said ellipsoidal reflector and said lamp, said aspheric field lens, said diffuser and said achromatic lens.

7. An illuminator system for producing light having high spatial uniformity comprising:
   an ellipsoidal reflector having a first focal point;
   a lamp located at said first focal point with respect to said ellipsoidal reflector, said ellipsoidal reflector and said lamp for producing light output in a first direction;
   an aspheric field lens in optical alignment with at least one of said ellipsoidal reflector and said lamp for receiving and transmitting light propagating in said first direction from said ellipsoidal reflector and said lamp;
   a diffuser in optical alignment with at least one of said ellipsoidal reflector and said lamp for receiving and transmitting light propagating in said first direction from said ellipsoidal reflector and said lamp;
   an achromatic lens in optical alignment with said at least one of said ellipsoidal reflector and said lamp for receiving light propagating in said first direction from said ellipsoidal reflector and said lamp, said transmitted light having high spatial uniformity; and
   a meniscus lens between said aspheric field lens and said achromatic lens.

8. The illuminator system as recited in claim 7 and further comprising a power control electrically connected to said lamp and having a detector in optical communication with said lamp and electrically connected to said power control.

9. An illuminator system for producing light having high spatial uniformity comprising:
   an ellipsoidal reflector having a first focal point;
   a lamp located at said first focal point with respect to said ellipsoidal reflector, said ellipsoidal reflector and said lamp for producing light output in a first direction;
   an aspheric field lens in optical alignment with at least one of said ellipsoidal reflector and said lamp for receiving and transmitting light propagating in said first direction from said ellipsoidal reflector and said lamp;
   a field homogenizer in optical alignment with at least one of said ellipsoidal reflector and said lamp for receiving and transmitting light propagating in said first direction from said ellipsoidal reflector and said lamp; and wherein said field homogenizer further comprises:
     a first diffuser in optical alignment between said ellipsoidal reflector and said aspheric field lens;
     a second diffuser, said aspheric field lens in optical alignment between said first and said second diffuser;
     a first neutral density filter wheel optical alignment with said second diffuser;
     a shutter in optical alignment with said first neutral density filter;
     a second neutral density filter wheel in optical alignment with said shutter and also in optical alignment with said achromatic lens;
   an achromatic lens in optical alignment with said at least one of said ellipsoidal reflector and said lamp for receiving light propagating in said first direction from said ellipsoidal reflector and said lamp, said transmitted light having high spatial uniformity.

10. The illuminator system as recited in claim 9 wherein said first and second diffusers are holographic diffusers.

11. The illuminator system as recited in claim 9 and further comprising a filter wheel in optical alignment between said shutter and said second neutral density filter wheel.

12. The illuminator system as recited in claim 11 wherein said filter wheel is a bandpass filter wheel.

13. An illuminator system for producing light having high spatial uniformity comprising:
   an ellipsoidal reflector having a first focal point;
   a lamp located at said first focal point with respect to said ellipsoidal reflector, said ellipsoidal reflector and said lamp for producing light output in a first direction;
   an aspheric field lens in optical alignment with at least one of said ellipsoidal reflector and said lamp for receiving and transmitting light propagating in said first direction from said ellipsoidal reflector and said lamp;
   a field homogenizer in optical alignment with at least one of said ellipsoidal reflector and said lamp for receiving and transmitting light propagating in said first direction from said ellipsoidal reflector and said lamp;

an achromatic lens in optical alignment with said at least one of said ellipsoidal reflector and said lamp for receiving light propagating in said first direction from said ellipsoidal reflector and said lamp, said transmitted light having high spatial uniformity; and a meniscus lens in optical alignment between said field homogenizer and said aspheric lens.

14. The illuminator system as recited in claim 1 and further comprising a power control electrically connected to said lamp and having a detector in optical communication with said lamp and electrically connected to said power control.

15. The illuminator system as recited in claim 13 and further comprising a power control electrically connected to said lamp and having a detector in optical communication with said lamp and electrically connected to said power control.

* * * * *